(12) United States Patent
Trumbore

(10) Patent No.: US 10,189,994 B2
(45) Date of Patent: Jan. 29, 2019

(54) USE OF A WAX-MODIFIED, AIR RECTIFIED ASPHALT IN BUILT UP ROOFING ASPHALT COMPOSITIONS

(71) Applicant: Owens Corning Intellectual Capital, LLC, Toledo, OH (US)

(72) Inventor: David C. Trumbore, Chicago, IL (US)

(73) Assignee: Owens Corning Intellectual Capital, LLC, Toledo, OH (US)

(*) Notice: Subject to any disclaimer, the term of this patent is extended or adjusted under 35 U.S.C. 154(b) by 411 days.

(21) Appl. No.: 14/944,374

(22) Filed: Nov. 18, 2015

(65) Prior Publication Data

US 2016/0145436 A1    May 26, 2016

Related U.S. Application Data

(60) Provisional application No. 62/082,683, filed on Nov. 21, 2014.

(51) Int. Cl.
*C08L 95/00* (2006.01)
*C08L 91/06* (2006.01)
*E04D 11/02* (2006.01)
*E04D 7/00* (2006.01)

(52) U.S. Cl.
CPC ............. *C08L 95/00* (2013.01); *C08L 91/06* (2013.01); *E04D 11/02* (2013.01); *C08L 2201/08* (2013.01); *C08L 2555/64* (2013.01); *C08L 2555/72* (2013.01); *E04D 7/00* (2013.01)

(58) Field of Classification Search
CPC ......... C08L 95/00; C09D 195/00; C10C 3/00; C04B 26/26; E04D 11/00; E04D 11/02; D04D 5/00
See application file for complete search history.

(56) References Cited

U.S. PATENT DOCUMENTS

| 4,554,023 | A | 11/1985 | Janicki |
| 6,130,276 | A * | 10/2000 | Vermilion .......... B65B 63/08 206/524.7 |
| 7,857,904 | B2 | 12/2010 | Trumbore et al. |
| 7,951,239 | B2 | 5/2011 | Trumbore et al. |
| 7,951,240 | B2 | 5/2011 | Trumbore et al. |
| 8,753,442 | B2 | 6/2014 | Trumbore et al. |
| 2006/0141270 | A1 | 6/2006 | Zaki et al. |
| 2009/0000514 | A1 * | 1/2009 | Trumbore .......... C08L 95/00 106/270 |
| 2011/0197785 | A1 | 8/2011 | Trumbore et al. |

(Continued)

FOREIGN PATENT DOCUMENTS

GB    1528742    10/1978

OTHER PUBLICATIONS

ASTM D 312-00 (2006) Standard Specification for Asphalt Used in Roofing. Published Dec. 2006 (Year: 2006).*

(Continued)

*Primary Examiner* — Jennifer A Smith
*Assistant Examiner* — Alexandra M Moore
(74) *Attorney, Agent, or Firm* — Calfee, Halter & Griswold LLP

(57) ABSTRACT

A composition and method for making a heat stable, low application temperature Built Up Roofing Asphalt (BURA) is provided. The composition comprises a wax-modified, air rectified asphalt conforming to Type 3 BURA and, in some embodiments, Type 4 BURA specifications.

13 Claims, 1 Drawing Sheet

(56) References Cited

U.S. PATENT DOCUMENTS

| | | |
|---|---|---|
| 2013/0041070 A1 | 2/2013 | Zhou |
| 2013/0295394 A1 | 11/2013 | Hong et al. |
| 2014/0014000 A1* | 1/2014 | Franzen ................ C08L 95/00 106/273.1 |
| 2015/0259506 A1 | 9/2015 | Lewandowski et al. |

OTHER PUBLICATIONS

ASTM D 312-15 (2015) Standard Specification for Asphalt Used in Roofing. Published Mar. 2015 (Year: 2015).*
International Search Report and Written Opinion from PCT/US15/20659 dated Dec. 4, 2015.
Office action from U.S. Appl. No. 14/658,439 dated Feb. 22, 2018.
Achten et al., "Overview of Polycyclic Aromatic Compounds (PAC)", 6 pgs. Mar. 15, 2015.
Jojoba Oil, 1 page obtained from http://app.knovel.com/hotlink/pdf/id:kt00C44581/physical-chemical-characteristics/jojoba-oil.
Office Action from U.S. Appl. No. 14/658,439 dated Sep. 19, 2018.

* cited by examiner

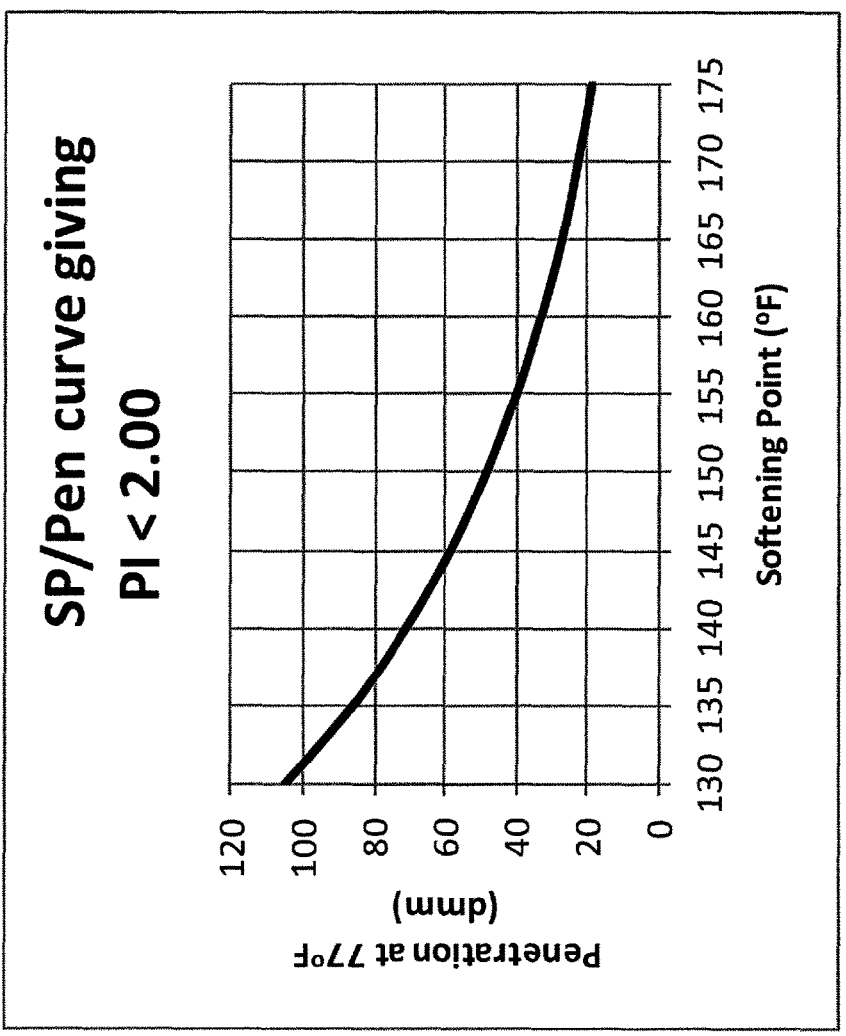

USE OF A WAX-MODIFIED, AIR RECTIFIED ASPHALT IN BUILT UP ROOFING ASPHALT COMPOSITIONS

RELATED APPLICATIONS

This application claims priority from provisional application No. 62/082,683 filed on Nov. 21, 2014, titled "Use of a Wax-Modified, Air Rectified Asphalt in Built Up roofing Asphalt Compositions", the entire disclosure of which is incorporated herein by reference.

FIELD OF THE DISCLOSURE

The present disclosure relates generally to asphalt roofing products, including asphalt for Built Up Roofing Asphalt (BURA) compositions. Particularly, the present disclosure relates to methods and compositions for producing a wax-modified, air rectified asphalt that meets the ASTM specifications for Type 3 BURA and, in some embodiments, Type 4 BURA. The wax-modified, air rectified asphalt disclosed herein may be applied at lower temperatures than conventional BURA compositions.

BACKGROUND

The Equiviscous Temperature (EVT) signifies the temperature needed to achieve the proper viscosity for proper application in the field. In order to achieve this temperature at application, the asphalt must be heated to an elevated temperature in a kettle prior to transport to a rooftop. It is desirable to minimize both the kettle temperature and the EVT to the extent possible, while still maintaining the desired heat stability, viscosity, and ductility for a BURA composition.

SUMMARY

Various exemplary embodiments of the present invention are directed to a heat stable, low application temperature, built-up roofing asphalt (BURA).

In some exemplary embodiments, a BURA composition is disclosed. The BURA composition includes an air rectified asphalt and a wax additive. The BURA composition has an equiviscous temperature (EVT) of from about 340° F. to about 390° F. for mopping applications and from about 380° F. to about 430° F. for mechanical applications. This is between about 50° F. and 83° F. lower than conventional BURA application temperatures.

BRIEF DESCRIPTION OF THE DRAWINGS

The advantages of this invention will be apparent upon consideration of the following detailed disclosure of the invention, especially when taken in conjunction with the accompanying drawings wherein:

FIG. 1 is a graph depicting a Penetration Index of less than 2, based on the definition provided by the Eurobitume Technical Committee Task Force in 2011.

DETAILED DESCRIPTION OF THE DISCLOSURE

Numerical ranges as used herein are intended to include every number and subset of numbers within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All references to singular characteristics or limitations of the present disclosure shall include the corresponding plural characteristic or limitation, and vice versa, unless otherwise specified or clearly implied to the contrary by the context in which the reference is made.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, or any other references, are each incorporated by reference in their entireties, including all data, tables, figures, and text presented in the cited references. In the drawings, the thickness of the lines, layers, and regions may be exaggerated for clarity. It is to be noted that like numbers found throughout the figures denote like elements.

A heat stable, low application temperature, built-up roofing asphalt (BURA) composition is described in detail herein. In some exemplary embodiments, the inventive composition includes an air rectified asphalt and a wax additive to meet the ASTM D 312 specifications for Type 3 BURA, and in some embodiments, Type 4 BURA. Further, the application temperature of the BURA composition disclosed herein is about 50° F. and 83° F. lower than conventional BURA application temperatures.

U.S. Pat. No. 4,554,023, incorporated herein by reference in its entirety, discloses the use of a bis-stearoylamide additive to reduce the viscosity of an asphalt to a viscosity desired for an ultimate blend. BURA compositions in accordance with this present invention may include any combination or sub combination of the features disclosed by the present application and U.S. Pat. No. 4,554,023.

U.S. Pat. No. 7,857,904, U.S. Pat. No. 7,951,239, U.S. Pat. No. 7,951,240, and U.S. Pat. No. 8,753,442 each disclose a method for producing coating asphalts. U.S. Pat. No. 7,857,904, U.S. Pat. No. 7,951,239, U.S. Pat. No. 7,951,240, and U.S. Pat. No. 8,753,442 are each incorporated herein by reference in their entirety. The methods include partially air blowing the paving grade asphalt feedstock to lower its penetration value and raise its softening point. A wax is then added to the partially blown asphalt to further raise its softening point to a point that is within the desired range for coating asphalt. This process additionally incorporates a blowing catalyst, such as phosphoric acid, to further soften the asphalt. BURA compositions in accordance with this present invention may include any combination or sub combination of the features disclosed by the present application and U.S. Pat. No. 7,857,904, U.S. Pat. No. 7,951,239, U.S. Pat. No. 7,951,240, and U.S. Pat. No. 8,753,442.

U.S. patent application Ser. No. 61/953,413, incorporated herein by reference in its entirety, discloses methods and compositions for producing BURA and coating asphalt compositions from non-coating grade asphalts, such as paving-grade asphalts. The built up roofing asphalt composition incorporates an ester additive, such as a vegetable oil, fat, or plasticizer to over blown paving asphalt. BURA compositions in accordance with this present invention may include any combination or sub combination of the features disclosed by the present application and U.S. patent application Ser. No. 61/953,413.

Definitions

As used herein, unless otherwise specified, the term "asphalt" is meant to include asphalts produced from petroleum refining, including residua from atmospheric distillation, from vacuum distillation, from solvent de-asphalting units, and from recycled asphalt or petroleum product streams, such as re-refined motor oil bottoms. Mixtures of different asphalts may also be used. The general inventive concepts may also be used with natural bitumen, such as the products extracted from the oil sands in Alberta or asphalts derived from oil sands by various refinery processes.

As used herein, unless otherwise specified, the term "BURA" means asphalt that is suitable for use as built up roofing asphalt according to the four types defined by ASTM D 312, displayed below in Table 1.

TABLE 1

Four Types of BURA According to ASTM D 312

| | TYPE 1 | | TYPE 2 | | TYPE 3 | | TYPE 4 | |
|---|---|---|---|---|---|---|---|---|
| | Min | Max | Min | Max | Min | Max | Min | Max |
| Property | | | | | | | | |
| Softening point ° C. (° F.) | 57 (135) | 66 (151) | 70 (158) | 80 (176) | 85 (185) | 96 (205) | 99 (210) | 107 (225) |
| Flash Point, ° C. (° F.) | 260 (500) | — | 260 (500) | — | 260 (500) | — | 260 (500) | — |
| Penetration Units: (dmm) | | | | | | | | |
| At 0° C. (32° F.) | 3 | | 6 | | 6 | | 6 | |
| At 25° C. (77° F.) | 18 | 60 | 18 | 40 | 15 | 35 | 12 | 25 |
| At 46° C. (115° F.) | 90 | 180 | — | 100 | — | 90 | — | 75 |
| Ductility at 25° C. | 10.0 | — | 3.0 | — | 2.5 | — | 1.5 | — |
| Solubility in trichloroethylene % | 99 | — | 99 | — | 99 | — | 99 | — |

The general inventive concepts herein relate to an asphalt composition that meets the properties listed in Table 1 for classification as Type 3 BURA, and in some embodiments, Type 4 BURA.

The properties of the disclosed asphalt compositions may be measured by any suitable test known and accepted in the art. In the description provided herein, the asphalt properties are measured as follows: softening point or "SP" by ASTM D36; penetration or "pen" by ASTM D5 run at 25° C.; melt viscosity or "visc" by ASTM D4402; durability by ASTM D4798; flashpoint by ASTM D92; stain index by ASTM D2746; and stability by ASTM D3791 modified to run at oven temperature of 260° C. for up to 5 days or similar test procedure.

Any suitable asphalt(s) may be used in accordance with the BURA compositions disclosed herein. For example, paving asphalts which meet the PG64-22 specifications (AASHTO M320) may be used, especially those meeting or exceeding the first number, 64, which is the average seven day maximum pavement temperature performance test and is based on rheological properties such as dynamic shear. Paving asphalts were traditionally graded by viscosity, and a common asphalt that is similar to the PG64-22 grade and usable in this method is the AC20 grade (ASTM D3381). Other examples of paving asphalts that may be suitable include PG67-22, PG-70-22, PG58-22, PG70-16, PG70-10, PG67-10, pen grade 40-50, pen grade 60-70, pen grade 85-100, pen grade 120-150, AR4000, AR8000, and AC30 grade. Additionally softer asphalts, commonly called roofers flux, as well as harder asphalts from solvent deasphalting processes can both be used in blends or with various paving asphalts to achieve the desired BURA product.

Method of Making the Air Rectified, Wax-Modified BURA

The present disclosure is directed to a heat stable BURA composition. In some exemplary embodiments, the inventive composition includes an air rectified asphalt and a wax additive to meet the ASTM D 312 specifications for Type 3 BURA and, in some embodiments, Type 4 BURA.

As described in detail hereafter, the general inventive concepts encompass the use of air rectified, as opposed to more fully oxidized, asphalt in a BURA composition. Eurobitume has defined air rectified asphalt by a Penetration Index threshold, and this definition has generally been adopted in the field. The Penetration Index (PI) is calculated based on the softening point and penetration of the asphalt. FIG. 1 shows the combination of softening point and penetration that meets the Eurobitume distinction for air rectified asphalt. Combinations of softening point and penetration that lie below the curve in FIG. 1 give PI's of less than 2, and thus meet the standard for air rectified asphalts. In contrast, combinations above the line give PI's of greater than 2, and are defined as more fully oxidized asphalts.

A conventional air blowing process involves the oxidation of an asphalt composition by bubbling or blowing oxygen-containing gas (for example, air, oxygen or an oxygen-inert gas mixture) through molten asphalt at an elevated temperature for a particular processing time, such as from about 1 hour to about 12 hours. The processing time depends on various factors, such as the type of asphalt feedstock used, the processing temperature, the air flow rate, the design of the process equipment, and the desired characteristics of the BURA composition to be produced. The process involves loading the asphalt feedstock into a converter (oxidizer) at any suitable temperature, for example, a temperature of from about 200° C. to about 230° C. Thereafter, the gas is bubbled or blown through the molten asphalt. The reaction produced by the blowing is exothermic and raises the temperature of the asphalt to any suitable blowing temperature, for example, a temperature of from about 250° C. about 265° C. The maximum temperature is usually controlled by a water-cooled jacket. In some exemplary embodiments, the process is carried out at ambient pressure, although it can also be carried out at elevated pressure. In some exemplary embodiments, the process is carried out in batches, although it can also be carried out continuously.

Thus, whereas oxidized asphalts are produced over a wide range of softening points and penetrations, air rectified asphalts are blown for a shorter time than higher softening point products, and are often referred to as "partially blown" or "semi-blown."

The "target softening point range" is the range that meets the ASTM specification for the BURA composition. For example, for Type 3 BURA, the target softening point range is from 185° F. to 205° F. based on the ASTM D312 specification. The intermediate or first softening point that results from the partial blowing step to produce an air rectified asphalt is lower than the target softening point range. For example, the first softening point may be within a range of from about 140° F. to about 175° F., depending on the particular grade of asphalt used and depending on whether or not a catalyst is used during blowing. In some exemplary embodiments, the first softening point is within a range of from about 145° F. to about 165° F. In some embodiments the first softening point is about 164° F. In some exemplary embodiments, the first softening point is about 156° F. In some exemplary embodiments, the first softening point is about 145° F.

In some exemplary embodiments, a blowing catalyst may be added to the asphalt before or during the partial blowing process. Several catalysts may be suitable for use in the air blowing process to either speed up the reaction or to create a final product with a higher penetration. If an optional blowing catalyst is used, any type of blowing catalyst or mixture of blowing catalysts may be used. Common catalysts include ferric chloride and phosphoric acid The blowing process generates flue gases, which generally may contain hydrogen sulfide, sulfur oxides (SOX), organosulfur compounds, hydrocarbons, nitrogen oxides (NOX), carbon monoxide, and water. When ferric chloride is used as a catalyst, the flue gases may also contain hydrogen chloride. Prior to release into the atmosphere, the flue gases are typically passed through a water-sealed knockout tank and then subjected to an incineration process to control the emissions of volatile organic compounds (VOCs). In that process, the sulfur compounds are oxidized to form sulfur oxides, and the carbon monoxide is oxidized to carbon dioxide. The energy used to incinerate these fumes and the emissions that remain after incineration both increase as the processing time increases.

In accordance with the process described herein, a wax is added to the first softening point product. By adding a wax, the softening point is increased to the target softening point range while maintaining a penetration within the desired range. In other embodiments, the wax addition may lower or raise the penetration as it increases the softening point. In the case of a wax addition that lowers the penetration, the partial blowing step of the method would be stopped at a higher penetration value and hence lower softening point value. In that case, the wax addition step further lowers the penetration to a second penetration that is within the target penetration range. In one embodiment, the asphalt may be further blown after the wax addition and/or other additives may be added, provided the asphalt maintains the requirements of an "air rectified" asphalt.

Any type of wax, or a mixture of one or more different waxes capable of functioning as described herein, may be used in the present method. In some exemplary embodiments, the wax has a high congealing point or a high drop melt point of at least about 75° C., including at least about 90° C., and including at least about 100° C. When referring to wax testing, the term "melt point" is used to refer broadly to either congealing point or drop melt point, which are defined by ASTM D 938 in the case of congealing point and ASTM D 3954 in the case of drop melt point. Wax may also be characterized by penetration or hardness (ASTM D5 or ASTM D1321), density (ASTM D1505), viscosity (ASTM D4402 or ASTM D88), or acid value (ASTM D1386).

In accordance with the general inventive concepts, the wax may be a functionalized wax, a synthetic wax, or a naturally occurring wax. Further, the wax may be oxidized or non-oxidized. Some examples of synthetic waxes that may be suitable include ethylene bis-stearamide wax (EBS), Fischer-Tropsch wax (FT), oxidized Fischer-Tropsch wax (FTO), polyolefin waxes such as polyethylene wax (PE), oxidized polyethylene wax (PEO), polypropylene wax, polypropylene/polyethylene wax, alcohol wax, silicone wax, petroleum waxes such as microcrystalline wax or paraffin, and other synthetic waxes. Some examples of functionalized waxes include amine waxes, amide waxes, ester waxes, carboxylic acid waxes, and microcrystalline waxes.

Exemplary naturally occurring waxes may be those derived from a plant, animal or mineral. Examples of natural waxes include plant waxes such as candelilla wax, carnauba wax, rice wax, Japan wax and jojoba oil, animal waxes such as beeswax, lanolin and whale wax, and mineral waxes such as montan wax, ozokerite and ceresin.

Certain types of waxes may be particularly effective for use with the BURA compositions disclosed herein. In some embodiments, the wax is a Fischer-Tropsch wax with a melt point of greater than 100° C., and a hardness at 25° C. of 1 dmm or less. In other embodiments, the wax is a polyethylene wax with a melt point of greater than 100° C. up to about 120° C., a hardness at 25° C. up to about to 4 dmm, a density of from about 0.91 to about 0.95 gm/cc, a viscosity of about 20 to about 450 cps at 140° C., and a nil acid number. In other embodiments, the wax is an oxidized polyethylene wax with melt point of about 135 to about 140° C., a hardness at 25° C. of <0.5 dmm, a viscosity of about 3600 to about 4500 at 150° C., and acid number of 30. In other embodiments, the wax is an ethylene bis-stearamide wax with a melt point of about 135° C. to about 145° C. and an acid number of 8.

Further, any suitable mixtures of different waxes may also be used. For example, the wax may include a blend of a Fischer-Tropsch wax and a polyethylene wax.

In accordance with the general inventive concepts, the wax may be added in any suitable amount. In some exemplary embodiments, the wax is added in an amount from about 1% to about 5% by weight, including from about 1.5% to about 4.5% by weight, including from about 2.5% to about 3.5% by weight of the BURA composition.

Properties of the Air Rectified, Wax-Modified BURA Composition

In some exemplary embodiments, the air rectified, wax-modified asphalt provides the inventive BURA composition a resistance to a phenomenon known as "dropback." Dropback is a phenomenon that occurs when asphalt is exposed to high temperatures for a prolonged period of time. In general, the higher the temperature, or the longer the asphalt is exposed to heat, the lower the softening point and higher the penetration value may become. However, even after being exposed to heat (about 500° F.) for 5 hours, 24 hours, or more, the inventive BURA composition does not exhibit a significant change in softening point or penetration level. In some exemplary embodiments, the BURA compositions average a loss of about 1° F. softening point after 5 hours at 500° F. and a gain of about 1° F. softening point after 24 hours at 500° F.

As discussed throughout the present disclosure, the inventive concepts relate to a BURA composition comprising air rectified, as opposed to more fully oxidized, asphalt. The Equiviscous Temperature (EVT) is used to determine the temperature to which the asphalt needs to be heated in order to achieve proper application. The EVT is evaluated based on ASTM D 4402 standards. For mopping application, a temperature is needed that achieves an asphalt viscosity of 125 cps. For mechanical application, a temperature is needed that achieves an asphalt viscosity of 75 cps. The BURA composition disclosed herein has an application temperature that is between about 50° F. and 83° F. lower than typical conventional BURA application temperatures. In some exemplary embodiments, the BURA composition has an equiviscous temperature (EVT) of from about 340° F. to about 390° F. for mopping applications and from about 380° F. to about 430° F. for mechanical applications. In some exemplary embodiments, the BURA composition disclosed herein provides an average decrease in EVT of about 59° F. for mopping and about 45° F. for mechanical applications compared to typical conventional BURA compositions. In some exemplary embodiments, the BURA composition disclosed herein provides an average decrease in EVT of about 67° F. for mopping and about 83° F. for mechanical applications compared to conventional BURA compositions.

The general inventive concepts have been described above both generically and with regard to various exemplary embodiments. Although the general inventive concepts have been set forth in what is believed to be exemplary illustrative embodiments, a wide variety of alternatives known to those of skill in the art can be selected within the generic disclosure. The general inventive concepts are not otherwise limited, except for the recitation of the claims set forth below.

As used in the description of the invention and the appended claims, the singular forms "a," "an," and "the" are intended to include the plural forms as well, unless the context clearly indicates otherwise. To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

Unless otherwise indicated herein, all sub-embodiments and optional embodiments are respective sub-embodiments and optional embodiments to all embodiments described herein. While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative process, and illustrative examples shown and described. Accordingly, departures may be made from such details without departing from the spirit or scope of the applicant's general disclosure herein.

What is claimed is:

1. A heat stable asphalt composition that meets ASTM D 312 (2006) built-up roofing asphalt ("BURA") specifications, the heat stable asphalt composition comprising:
    an air rectified asphalt; and
    a wax additive, wherein the additive has a melt point higher than about 100° C.;
    wherein the composition has an equiviscous temperature (EVT) of from about 340° F. to about 390° F. for mopping applications and from about 380° F. to about 430° F. for mechanical applications, and wherein the composition has a minimum solubility in trichloroethylene of 99%.

2. The heat stable asphalt composition of claim 1, wherein the air rectified asphalt is blown to a first softening point from about 140° F. to about 175° F.

3. The heat stable asphalt composition of claim 1, wherein the air rectified asphalt is blown to a first softening point that is at least about 145° F.

4. The heat stable asphalt composition of claim 1, wherein the air rectified asphalt is blown to a first softening point from about 145° F. to about 165° F.

5. The heat stable asphalt composition of claim 1, wherein the air rectified asphalt is blown to a first softening point that is at least about 156° F.

6. The heat stable asphalt composition of claim 1, wherein the air rectified asphalt is blown to a first softening point of about 164° F.

7. The heat stable asphalt composition of claim 1, wherein the wax additive comprises from about 1.5% to about 4.5% based on the weight of the total BURA composition.

8. The heat stable asphalt composition of claim 1, wherein the wax additive comprises one or more of a functionalized wax, a synthetic wax, or a naturally occurring wax.

9. The heat stable asphalt composition of claim 1, wherein the wax additive comprises a synthetic wax selected from ethylene bis-stearamide wax (EBS), Fischer-Tropsch wax (FT), oxidized Fischer-Tropsch wax (FTO), polyolefin wax, polyethylene wax (PE), oxidized polyethylene wax (PEO), polypropylene wax, polypropylene/polyethylene wax, alcohol wax, silicone wax, petroleum wax, microcrystalline wax, or paraffin.

10. The heat stable asphalt composition of claim 9, wherein the wax additive comprises one or more of a Fischer-Tropsch wax, a polyethylene wax, and an ethylene bis-stearamide wax.

11. The heat stable asphalt composition of claim 1, wherein the wax additive comprises a functionalized wax selected from amine waxes, amide waxes, ester waxes, carboxylic acid waxes, and microcrystalline waxes.

12. The heat stable asphalt composition of claim 1, wherein the wax additive comprises a naturally occurring wax derived from a plant, animal or mineral.

13. The heat stable asphalt composition of claim 12, wherein the naturally occurring wax is selected from candelilla wax, carnauba wax, rice wax, Japan wax, jojoba oil, beeswax, lanolin whale wax, montan wax, ozokerite and ceresin.

* * * * *